Dec. 30, 1958           G. C. STOUT           2,866,609
SHIMMY ARRESTER FOR CASTERING WHEEL
Filed Oct. 5, 1953           2 Sheets-Sheet 1
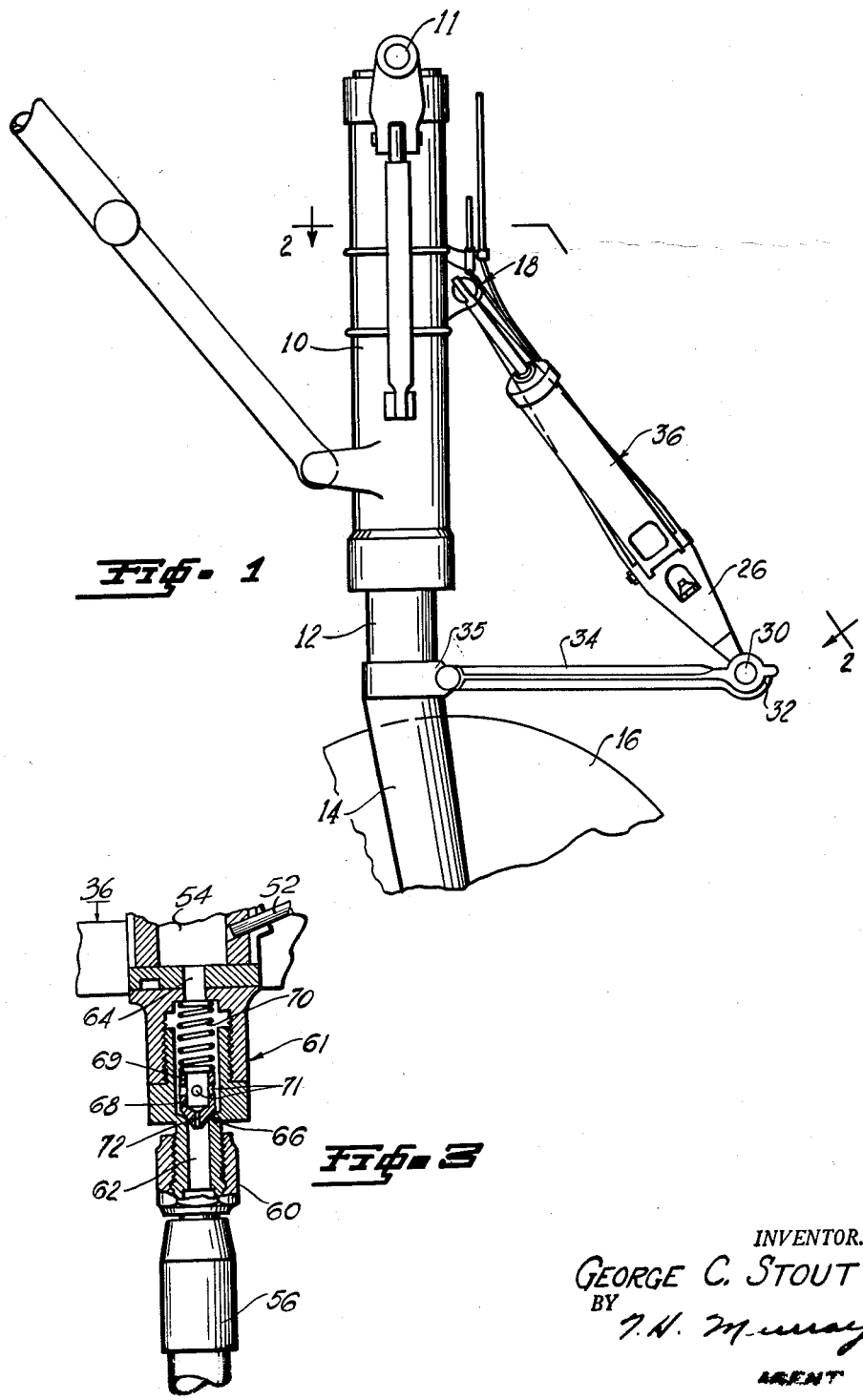
INVENTOR.
GEORGE C. STOUT
BY
AGENT

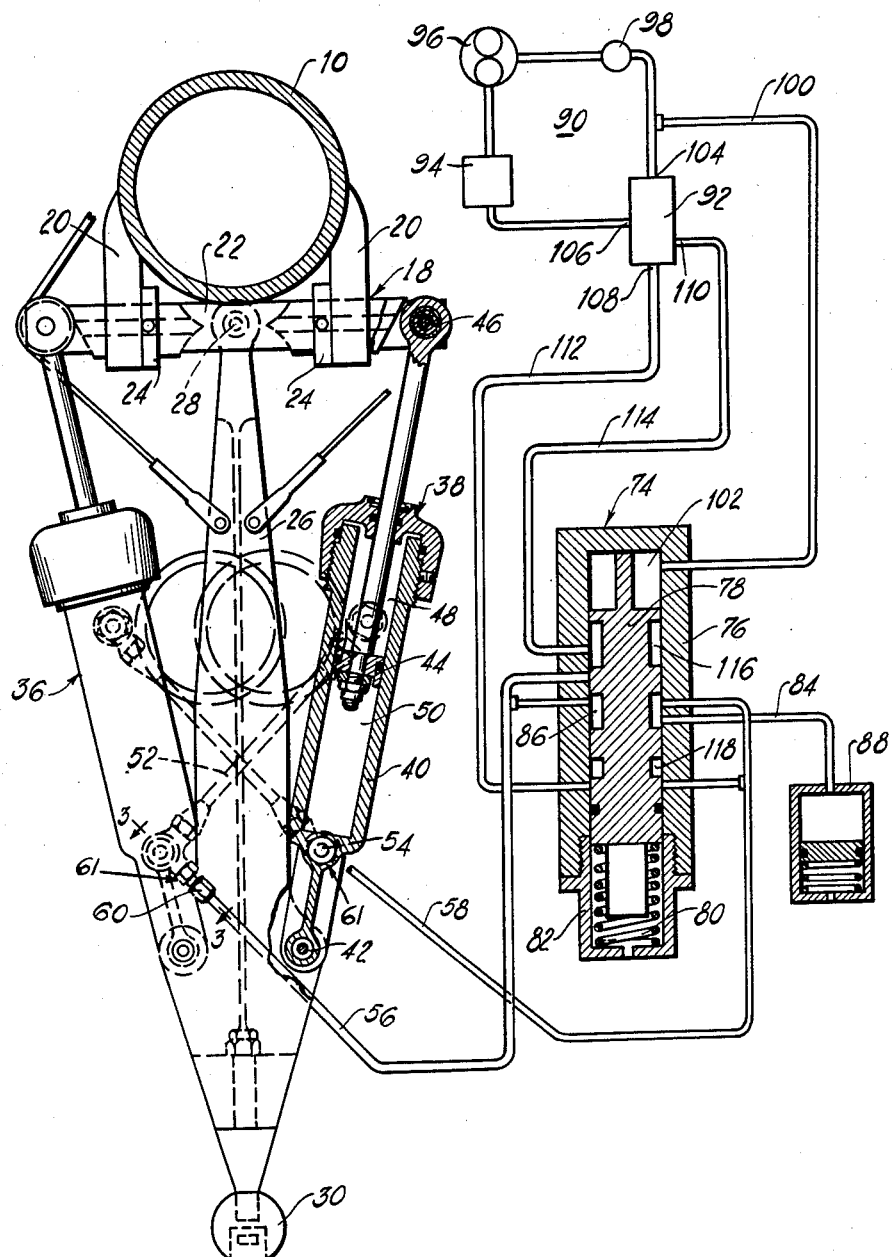

2,866,609
Patented Dec. 30, 1958

2,866,609

SHIMMY ARRESTER FOR CASTERING WHEEL

George C. Stout, South Bend, Ind., assignor to Bendix Aviation Corporation, South Bend, Ind., a corporation of Delaware Application October 5, 1953, Serial No. 384,158

8 Claims. (Cl. 244—50)

This invention relates to a device which will arrest shimmy or rapid oscillation of a castering aircraft wheel and more particularly to a shimmy arresting device which can be used in combination with a steering system for a castering wheel.

In order to facilitate ground steering of an aircraft it is necessary that at least one of the wheels of the landing gear be free to caster; that is, free to pivot about a substantially vertical axis. Castered wheels are also employed in what is commonly known as "cross wind landing gear." This type of cross wind undercarriage employs a plurality of castered wheels which enable the aircraft to travel on a runway with its axis at an angle to the direction of forward movement. Thus, when the aircraft alights on the ground in a cross wind with its longitudinal axis at an angle to the landing strip, the castered wheels can always adjust themselves to take the forward thrust of the aircraft, and the danger of cross wind landings inherent in other types of landing gear is thereby eliminated.

Although a castered wheel is in this way very necessary and desirable for ground steering and cross wind landings, it also has an undesirable tendency to shimmy or oscillate about its vertical castering axis upon movement of the wheel over the ground.

Accordingly, it is an object of this invention to provide suitable means for arresting shimmy in a castering wheel.

An important object of the invention is to provide in combination with a ground steering system for a freely castering aircraft wheel means for damping torsional vibrations of the wheel about its castering axis.

Another object of the invention is to provide a means for throttling fluid under pressure applied to either end of a double-acting fluid motor to thereby prevent uncontrolled and abrupt actuation of the motor.

A still further object of the invention is to provide in a double-acting cylinder and piston combination, a device for arresting rapid oscillations of the piston within the cylinder by restricting fluid flow from one side of the cylinder through an orifice and at the same time allowing unrestricted flow into the opposite side of the cylinder.

The above and other objects and features of the invention will become apparent from the following description taken in connection with the accompanying drawings which form a part of this specification and in which:

Figure 1 is a view of a steerable aircraft landing strut with which the present invention is illustrated;

Figure 2 is a view taken along line 2—2 of Figure 1 showing the steering mechanism of the strut in combination with a schematic representation of the fluid system of the invention; and Figure 3 is a sectional view of the restricter valve of the invention taken along line 3—3 of Figure 2.

In Figures 1 and 2, a torque link steering system is shown in connection with the nose wheel of a tricycle landing gear. Although the invention is adaptable to this type of steering system, it is to be understood that the present system is used for purposes of illustration only and that other and different types of steering systems may be used without departing from the spirit and scope of the invention. Referring more specifically to the drawings, the front wheel strut 10 of a tricycle landing gear is mounted for pivotal connection at 11 to the underside of an aircraft. Carried within strut 10 for rotational movement about its axis is an inner cylinder 12 which may be equipped with any suitable shock absorbing means, not shown. At the lower extremity of cylinder 12 is an integral fork 14 within which is carried the nose wheel 16. On the upper portion of strut 10 is carried a trunnion assembly 18 which includes a pair of brackets 20 through which extends a rotatable trunnion 22. The trunnion is prevented from sliding axially by a pair of axially spaced collars 24. A stabilizer link 26 is mounted for pivotal motion on the trunnion assembly at 28. The opposite end of link 26 is equipped with a ball 30 disposed between a pair of ball seats 32. These ball seats are formed at the outwardly projecting end of a torque arm 34 which is pivotally secured to inner cylinder 12 by means of a bracket 35.

Connected between the laterally extending extremities of trunnion 22 and the lower extremity of link 26 are a pair of identical fluid motors 36 and 38. One of the fluid motors is sectioned to show its various parts and comprises a cylinder 40 which is pivoted at 42 to link 26 and a piston 44 having a piston rod pivotally fastened on the trunnion at 46. Piston 44 divides the cylinder into an upper chamber 48 and a lower chamber 50. The lower chamber of motor 36 is connected to the upper chamber of motor 38 and vice versa by a pair of conduits 52 which are constructed to absorb slight changes in the distance between the ends of the conduits as the system moves to the left or right. Lateral passages 54, which communicate with chambers 50 and conduits 52, are connected to a pair of fluid pressure lines 56 and 58. At this point it can be seen that if, for example, a source of fluid pressure is connected to line 56 the lower chamber of motor 36 and the upper chamber of motor 38 will be pressurized thereby simultaneously tending to shorten the rod of motor 38 and extend the rod of motor 36. The total force of the two thus develops a torque tending to turn link 26, torque arm 34, and inner cylinder 12 about the axis of strut 10.

Disposed within fittings 60, which connect each pressure line to its associated lateral passage 54, are a pair of restrictor check valves 61, shown in Figure 3. Each valve includes an inlet passage 62 and an outlet passage 64. Between these passages is a conical valve seat 66 and an associated conical valve element 68 which is normally held on the valve seat by a coil spring 70. Valve element 68 has an integral skirted portion 69 having a series of laterally extending holes 71 therein which insure an unrestricted passage between the inlet and outlet passages once the valve element 68 is unseated. Extending through the valve element is a small passage or orifice 72 which insures restricted communication between the inlet and outlet ports at all times. Fluid flowing from inlet passage 62 will automatically open the valve and permit unrestricted flow to outlet passage 64. However, if the direction of flow is reversed, the fluid must flow through orifice 72. Note that in the reversed direction the flow of fluid tends to close, rather than open, the valve. The function of these restrictor check valves will become apparent as the description proceeds.

As shown in Figure 2, pressure lines 56 and 58 are connected to a slide selector valve 74. This valve may be of any suitable type and in the present embodiment comprises a housing 76 having a slidable valve member 78 therein. Member 78 is urged to its neutral position shown in Figure 2 by a spring 80 interposed between the valve member and an end cap 82 which threadedly engages housing 76. The valve member is equipped with a series of reduced diameter portions which form annular channels for connecting various conduits leading to the valve depending upon the position of the valve element within housing 76. In the neutral position of the valve shown in Figure 2 communication is established between lines 56 and 58 and conduit 84 by means of annular passage 86. A compensator 88, connected to conduit 84, serves to maintain a constant pressure in the system which is established during neutral position of the valve by compensaitng for any changes in fluid volume due to temperature variations and other causes.

A fluid pressure distributing system, generally indicated at 90, serves to selectively apply fluid pressure to one or the other of lines 56 or 58 when the selector valve is in its working positon, that is, away from neutral position. This system includes a control valve 92, a reservoir 94, pump 96, and master valve 98, all of which are connected by suitable conduits as shown. A conduit 100 serves to join the distributing system to a chamber 102 formed between the top of valve member 78 and housing 76. Control valve 92 may be of any suitable type having an inlet connection 104, an outlet connection 106 and a pair of working connections 108 and 110. The valve is such as to communicate the inlet connection 104 to one of the working connections while simultaneously connecting the other of the working connections to outlet connection 106. Conduits 112 and 114 communicate the working connections of control valve 92 to selector valve 74 as shown.

The function and operation of the invention is as follows: With the selector valve 74 in its neutral position shown in Figure 2, master valve 98 will be closed and communication will be established between the various upper and lower chambers of the fluid motors so that wheel 16 can swivel or caster freely about the axis of strut 10. If the wheel 16 begins to shimmy or oscillate as a result of passage over rough and uneven ground surfaces, the rapid reciprocation of pistons 44 will cause a resultant intermittent rush of fluid through orifice 72 of each restrictor check valve. For a given increment of movement of the torque arm in shimmying, the volume of the upper and lower cylinder chambers from which fluid is exhausted will decrease and the volume of the chambers into which fluid is admitted will increase. For each intermittent rush of fluid flow from the exhausting chambers and through the orifice of one restrictor check valve, a like rush of fluid must flow through the other valve in the opposite direction to automatically unseat valve element 68 in the other valve and allow fluid to flow freely into the admitting or expanding chambers. It should be noted that the use of restrictor check valves allowing restricted communication in one direction and free flow in the other is necessary to make the present system work efficiently as a shimmy damper. That is, if the restrictor valve associated with the expanding chambers were not to open, and fluid would have to flow into the expanding chambers through an orifice, a back pressure would build up in lines 56 and 58. This back pressure would cause flow into compensator 88 rather than into the expanding chambers thereby causing a vacuum pocket in the expanding chambers which would accentuate, rather than arrest, the shimmy. The problem of back pressure cannot be solved by eliminating compensator 88 since if the compensator were not in the system a vacuum pocket could form due to temperature variations and leaks.

To incorpcrate steering into the system, master valve 98 is opened. Pressure will then be admitted into chamber 102 through conduit 100 to force valve member 78 downward against the action of spring 80. The valve member will now be positioned to establish communication between line 56 and conduit 114 through annular passage 116 and between line 58 and conduit 112 through annular passage 118. Fluid pressure can now be selectively applied to either one of lines 56 and 58 by manual operation of control valve 92. Note that fluid flowing into the expanding chambers during turning will unseat valve element 68 thereby permitting unrestricted pressure to be applied in turning the wheel. The degree of pressure used on the inlet side of the motor is such that if there were no restriction in the outlet the wheel would turn suddenly or abruptly, and control over turning would be impaired. The orifice 72 in the outlet check valve throttles the pressure thereby causing the turning to be gradual and controllable. Thus, it can be seen that the restrictor check valve serves a dual function of arresting shimmy and throttling the return of fluid pressure to control valve 92 in the steering operation.

In order to lock wheel 16 in position and prevent it from castering, lines 56 and 58 may be blocked by adjustment of valve 74 or by some other means, not shown. In this way the aircraft may be towed along the ground in a straight line.

Although only one embodiment of my invention has been shown and described in detail, it will be understood by those skilled in the art that various changes in form and arrangement of parts can be made to suit requirements.

Having thus described the various features of the invention, what I claim as new and desire to secure by Letters Patent is:

I claim:

1. In a ground steering system for a castering aircraft wheel, means for arresting shimmy in the wheel including a fluid motor adapted to steer said wheel by rotating the same about its castering axis, said fluid motor defining two variable volume chambers, a pair of conduits connected to said motor for conducting fluid pressure to one or the other of said chambers, means for interconnecting said conduits at all times except when the system performs its steering function, means for maintaining a constant pressure in said conduits, and valve means in each of said conduits permitting unrestricted fluid flow into said chambers, said valve means comprising a conical valve seat, a conical valve element seatable thereon in such a manner that fluid flowing into said motor will lift the valve element from its associated valve seat, means urging the valve element toward said seat, and a restricted passage associated with said valve means permitting a throttled flow of fluid from said chambers at all times, but unrestricted flow into said chamber at all times.

2. In a ground steering system for a castering aircraft wheel, a torque linkage means for arresting shimmy in the wheel including two fluid motors adapted to steer said wheel by rotating the same about its castering axis, said fluid motors each having two variable volume chambers, a pair of conduits connected to each of said motors for conducting fluid pressure to one or the other of said chambers, a second pair of conduits connecting the remote ends of said chambers to communicate the expanding and exhausting chambers respectively of said fluid motors, means for interconnecting said system of conduits at all times except when the system performs its steering function, means for maintaining a constant pressure in said conduits, and valve means permitting unrestricted flow to said motors, said valve means comprising a valve seat and a valve element seatable thereon, said valve element being such that fluid flowing into the expanding chambers of said fluid motors will unseat said element from its associated valve seat to permit unrestricted flow therein whereas fluid flowing from the exhausting chambers will tend to seat said element on said valve seat, and an orifice in the valve element permitting restricted flow from the exhausting chambers at all times.

3. A device for arresting shimmy in a castering wheel comprising a piston and cylinder combination connected to said wheel whereby movement of said piston will rotate the wheel about its castering axis, said piston and cylinder combination defining two variable volume chambers, a pair of conduits connected to said cylinder for conducting fluid pressure to one or the other of said chambers, means connected to said conduits for maintaining a constant pressure therein, said constant pressure being maintained during a neutral valve position, and valve means in each of said conduits for restricting fluid flow from said chambers but permitting free flow thereto, said valve means comprising a conical valve seat, a conical valve element seatable on said valve seat, resilient means urging said valve element toward its valve seat, and an orifice in said valve element allowing said restricted flow from the chambers.

4. A torque link steering device for arresting shimmy in a castering wheel comprising two piston and cylinder combinations each connected at one end thereof to said wheel whereby movement of the pistons therein will rotate the wheel about its castering axis, said piston and cylinder combinations each having two variable volume chambers, a conduit connected to each of said combinations for conducting fluid pressure to the respective expanding chambers thereof, means connected to said conduits for maintaining a constant pressure therein, and means in each of said conduits permitting unrestricted fluid flow into the respective expanding chambers but restricted flow from the respective exhausting chambers at all times through a small orifice, said last mentioned means to provide a single orifice common to fluid flow from each of said combinations.

5. In a torque link system of the type employing fluid motors forming part of the torque linkage for steering a castering aircraft wheel, high and low pressure lines connected to each of said fluid motors, means for maintaining a constant pressure in said lines at all times except when the system is performing its steering function, and valve means in each of said conduits permitting unrestricted flow into said motor, said valve means comprising a valve seat, a valve element seatable thereon, means urging the valve element toward its associated valve seat, and an opening in said element allowing throttled fluid flow from said motor at all times, said element to be so located as to provide a single opening common to fluid flow from a plurality of chambers of said motor.

6. In a torque link steering system for a castering aircraft wheel employing two operatively interconnected double-acting fluid motors for steering the same, said motors each defining two variable volume chambers, a device for damping shimmy in said wheel comprising a pair of conduits for conducting fluid pressure to said chambers, means for connecting said conduits at all times except when the system performs its steering function, and means in each of said conduits allowing unrestricted flow into the expanding chambers of the respective fluid motors, said latter-mentioned means including a restricted passage through which fluid must flow in passing from said chambers when the chambers are exhausting fluid.

7. In a ground steering system for a castering aircraft wheel, means for arresting shimmy in the wheel including a fluid motor adapted to steer said wheel by rotating the same about its castering axis, said fluid motor defining two variable volume chambers, a pair of conduits connected to said motor for applying fluid pressure to one or the other of said chambers, means in said conduits including a restricted passage which will allow throttled flow from said chambers, said means also allowing unrestricted flow into said chambers, a source of fluid pressure for actuating said motor, means for maintaining a constant pressure in said system, and valve means interposed between the fluid pressure source and said motor, said valve means including a selector valve, a master valve controlling operation of said selector valve, said selector valve having a first position in which communication can be established between said fluid pressure source and either one of said conduits, a second position in which the conduits are connected together to allow free castering of the wheel, and a third position in which communication is blocked between the conduits to thereby lock said wheel in its castered position.

8. In a torque link steering system, the combination of a double-acting cylinder and piston assembly constituting part of the torque link steering, said cylinder and piston defining two variable volume chambers, high and low pressure conduits connecting the respective expanding and exhausting chambers, means operatively connected to said high and low pressure conduits for maintaining a constant pressure therein, a pair of restricter check valves located in the conduits for damping uncontrolled high frequency oscillations of the piston, each of said valves comprising a valve seat and a valve element seatable thereon, said valve element being such as to allow unrestricted fluid flow into one of said chambers, and a restricted passage in the valve allowing throttled flow from said exhausting chamber at all times.

References Cited in the file of this patent

UNITED STATES PATENTS

| | | |
|---|---|---|
| 1,887,287 | Churchill | Nov. 8, 1932 |
| 2,199,681 | Timm | May 7, 1940 |
| 2,418,325 | Wassall | Apr. 1, 1947 |
| 2,424,233 | Greenough | July 22, 1947 |
| 2,580,064 | Albright | Dec. 25, 1951 |
| 2,604,953 | Campbell | July 29, 1952 |
| 2,621,002 | Pittman | Dec. 9, 1952 |
| 2,622,827 | Hayman | Dec. 23, 1952 |